United States Patent [19]

Keeler

[11] 3,920,503

[45] Nov. 18, 1975

[54] APPARATUS FOR SEALING PLASTIC CLOSURES TO PLASTIC CONTAINERS

[75] Inventor: Frederick D. Keeler, Trumbull, Conn.

[73] Assignee: The K L M Company, Stratford, Conn.

[22] Filed: Nov. 18, 1973

[21] Appl. No.: 413,772

Related U.S. Application Data

[62] Division of Ser. No. 221,633, Jan. 28, 1972, Pat. No. 3,788,509.

[52] U.S. Cl. ............... 156/580; 156/69; 156/73.4; 215/1 C; 215/42; 215/252; 215/258; 228/1
[51] Int. Cl.² ........................................ B32B 31/00
[58] Field of Search ............... 156/69, 73, 580, 581; 29/470.3; 228/1; 215/1 C, 246, 252, 258

[56] References Cited
UNITED STATES PATENTS

| | | | |
|---|---|---|---|
| 3,284,257 | 11/1966 | Soloff et al. | 156/73.1 |
| 3,730,817 | 5/1973 | Frohlich et al. | 228/1 |
| 3,752,718 | 8/1973 | Potin | 156/73 X |
| 3,809,596 | 5/1974 | Gidge | 156/580 X |

*Primary Examiner*—Edward G. Whitby
*Attorney, Agent, or Firm*—Darby & Darby

[57] ABSTRACT

A method and apparatus for sealing a plastic closure to a plastic container in which a tool is inserted through a portion, or portions, of the closure wall into the container wall after the closure has been fastened to the container. The tool produces energy of a type to distort the side wall of the closure and the corresponding portion of the container wall to form a projection on the closure and a mating depression on the container to provide a mechanical seal. In a preferred embodiment of the invention, ultrasonic energy is used to distort the necessary portions of the closure and container to form the mechanical seal and, in some cases, an ultrasonic workpiece produces heat at the interface between the closure and container to provide a weld.

3 Claims, 11 Drawing Figures

APPARATUS FOR SEALING PLASTIC CLOSURES TO PLASTIC CONTAINERS

This is a division, of application Ser. No. 221,633, filed Jan. 28, 1972 now U.S. Pat. No. 3,788,509.

Containers made of plastic material have been used extensively for holding a variety of materials, such as, for example, liquids, powders. A number of types of closures have been used for sealing these plastic containers. These include conventional metal closures and plastic closures made by injection-molding. Another type of closure, made by thermoforming a sheet of plastic material, has also been used. A closure of this type is disclosed in the copending application of Childs and Ostrowski, Ser. No. 826,973, filed May 22, 1969 which is assigned to the same assignee of the subject application.

For any type of closure used to seal the opening of a plastic container, an effective seal should be made. To accomplish this, the closure should be prevented from "backing off" after it has been fastened to the container. This problem acquires considerable significance when plastic closures, of either the injection-molded or vacuum-formed types, are used on plastic containers. The reason for this is that both the surfaces of the closure and the container are relatively slippery and therefore there is a greater tendency for the closure to back off.

In the copending application of Keeler, Miller and Ellis, Ser. No. 120,893 filed Mar. 4, 1971 now U.S. Pat. No. 3,773,205 and entitled Thermoformed Closures Which Are Sealed To Containers by the Use of Sonic Energy and the Method of Sealing the Same which is assigned to the same assignee, various types of plastic closures are disclosed which are ultrasonically sealed to a plastic container or a glass container coated with plastic material. The seal is made by an ultrasonic "weld", that is, the vibrational energy produced at the interface of the two plastic surfaces creates heat which bonds the surfaces together. The closures and the methods disclosed in the aforesaid application have several advantages in that the closures can be fastened to the containers so that a predetermined amount of torque is required to break the ultrasonic welds and thereby remove the closure from the container. Further, where the ultrasonic weld is used, the closure will not back off of the container. In addition, in the aforesaid application various types of closures are disclosed which are of the so-called tamper-proof type. That is, a visible portion of the closure is distorted, broken or removed to indicate that an attempt has been made to remove the closure from the container or the removal has actually taken place.

In some applications where a plastic closure is used to seal a plastic container, an ultrasonic weld cannot be used. The reason for this is that the two plastics are of types that are incompatible or not very good for ultrasonic welding, for example, a styrene plastic and a polyethylene plastic. In general, it has been found that the best welds are made when the two plastics are of the same material or from the same family of materials.

The present invention relates to plastic closures and methods and apparatus for fastening such closures to plastic containers of the type whose walls can be distorted. The closure is also made of plastic material so that a portion of the closure can be distorted. Typical closures which are thermoformed from relatively thin plastic material are described in the aforesaid patent applications. To effect the seal of the closure to the container, a tool is applied against a selected portion of the closure. Energy is supplied to the tool to distort the closure as well as the adjacent portion of the container. The closure is distorted to have a projection where it is engaged by the tool and the container has a corresponding groove formed where it is distorted by the tool. The projection and groove arrangement mechanically lock the closure to the container. One or more such locks can be made. In a preferred embodiment of the invention, ultrasonic energy is supplied to the tool to deform the closure and container.

The deformation can be controlled and/or the tool shaped so that the deformed portion of the closure is weakened. Therefore, when the closure is unfastened from the container, the projection formed in the closure will be held within the groove in the container and shear away. This provides an indication that the closure has been removed from the bottle thereby providing a type of tamper-proof closure.

It is therefore an object of the present invention to provide a plastic closure and the method and apparatus for fastening the same to a plastic container.

A further object is to provide a plastic closure used to seal a plastic container in which the wall of both the closure and the container are defomred to produce a mechanical seal.

An additional object is to provide a plastic closure and the method of fastening the same to a plastic container in which an ultrasonic tool is applied to the closure to deform both the closure and the container and thereby provide a locking lug and groove arrangement.

Other objects and advantages of the present invention will become more apparent upon reference to the following specification and annexed drawings, in which.

Figure 1:
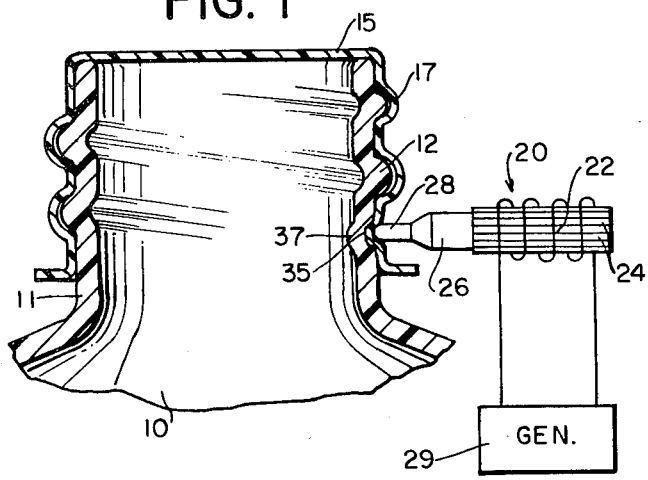
FIG. 1 is an elevational view taken partly in cross-section, showing one embodiment of the invention.

Referring to FIG. 1, the upper portion of a container 10 is shown which can be of any desirable shape or size for holding any suitable contents. The container is made of a plastic material whose walls are generally flexible and can be distorted, for example, a polyethylene or a polypropylene plastic. The container has a neck 11 with the usual screw threads 12 thereon.

A closure 15 is shown fitting over the neck 11 of container 10. Closure 15 is preferably made from a relatively thin sheet of plastic material of substantially uniform thickness by thermoforming, as disclosed in the aforesaid applications. The closure 15 has a top wall 13 with a depending skirt wall 16 having screw threads 17 thereon which mate with the screw threads 12 of the container. As will become apparent, the invention will operate with any suitable conventional fastening arrangement, screw threads being merely exemplary.

While the container 10 and closure 15 can be made of any suitable plastic material, for the purposes of description, it is considered that the materials of the closure 15 and the container 10 are dissimilar and not capable of being welded together by ultrasonics or of materials which will not ultrasonically weld together readily.

To perform the fastening arrangement in accordance with the subject invention an ultrasonic tool 20 is provided. The tool and the energy supply therefor are of any suitable type and the major portions thereof form no part of the present invention. As shown schematically in both FIGS. 1 and 3, the tool includes a driving coil 22 surrounding a stack of laminations 24 of a suitable magnetostrictive material. An acoustic impedance transformer 26 is coupled to the end of the stack of laminations 4. The transformer 26 can have any shape suitable to peform the required impedance transformation and to convey energy to a tool tip 28. The coil 22 is supplied energy from an ultrasonic generator 29 which is also of conventional construction. In general, the term ultrasonic energy is broadly defined as any energy capable of producing vibrational waves, the frequency of which can be anywhere in the order from 1 kilohertz to 100 kilohertz. While the lower end of this range is not ultrasonic in the strict literal sense, it is still considered to be ultrasonic energy for the purposes of description and in the art.

As shown in FIG. 1, the ultrasonic tool is applied with the required amount of pressure against the closure skirt wall 16. The energy produced by the generator 29 is converted into vibrationa energy by the lamination stack 24 to vibrate the tool 28. The tool sets up a frictional vibration with the wall of the closure to produce localized heating. This distorts the closure wall, in a manner consistent with the shape of the tool tip 28, to form a projection 35.

After the closure wall has been distorted, or at the same time it is being distorted, the vibrational energy is transmitted through the wall to the container neck 11 to distort it in a similar manner. As shown in cross-section in FIG. 1, a groove, or depression 37 is formed in the container wall which mates with the projection 35 of the closure wall. A mechanical lock is formed between the two.

It should be understood that as many of the locking arrangements can be provided as needed. The number of these, together with the size thereof, and the thickness of material remaining on the closure wall at the area of its deformation determines the torque needed to break the mechanical locks and remove the closure from the container.

The breaking of the mechanical lock or locks can occur in one of two ways. First, if the closure wall is relatively thick and/or the closure material is relatively flexible and the heights of the projections 35 are not too great, the projections 35 will ride out of the mating grooves 37 when the closure is turned. Second, if the height of the closure projections 35 are made relatively great and the material of the skirt wall is relatively thin or stiff, the closure projections 35 will shear away from the skirt wall as the closure is unfastened. The latter arrangement provides a tamper-proof closure since a visual indication is given that the closure has been unfastened from the container.

Figure 3:
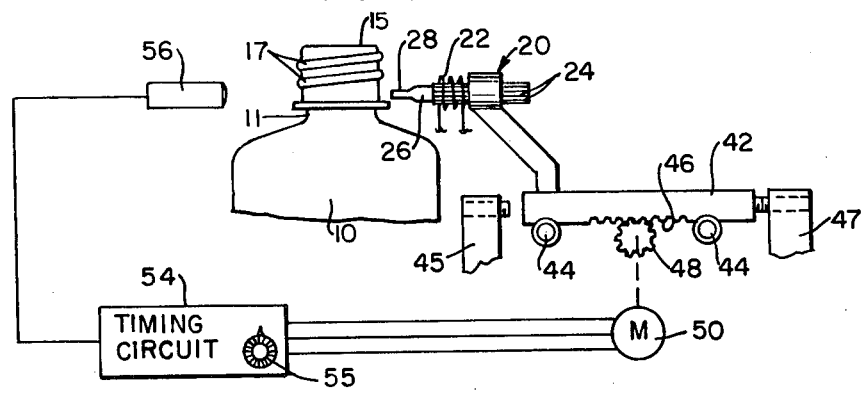
FIG. 3 is a view, partly in schematic form showing a system for making the locks.

FIG. 3 shows a system for making the locks between the closures and container. The ultrasonic tool 20 is fastened on a platform 42 which rides on runners or rollers 44 between adjustable forward and rear stops 45 and 47. Platform 42 has a rack 46 which is engaged by a pinion gear 48 located on the shaft of a reversible motor 50. The direction of rotation of motor 50 is controlled by a timing circuit 54 which is in turn controlled by a photoelectric sensor 56. The timing circuit has an adjustable control 55. The timing circuit also has a pair of leads which are connected to the ultrasonic generator to control its operation. The timing circuit can be of any conventional type such as relay controlled, solid-state switching, etc. All of these techniques and apparatus therefore are well known in the art.

In operation, the photoelectric sensor 56 senses the presence of a container and closure at the station adjacent tool 20. The photoelectric sensor produces a signal representative of this and sends the signal to the timing circuit 54. Upon receipt of this signal, the timing circuit energizes the "forward" line to the motor so that platform 42 moves toward the closure. At the same time, a signal is sent to the generator 29 to start the production of ultrasonic energy. A mechanical stop 45 limits the forward travel of platofrm 42 and thereby determines the limit of the depth of penetration of the tool tip 28 into the closure and container. Alternatively, the longitudinal position of the tool can be adjusted to accomplish this. The time that the motor moves in the forward direction, as set by control 55, and the force exerted by the motor on platform 42 is coordinated with the amount of vibrational energy produced by the tool 20 to produce the desired time energy relationship at the closure wall needed to obtain the desired degree of distortion and penetration of the tool into the closure wall. The intensity, or quantity, of energy produced by tool 20 is controlled by the generator 29.

After the desired time has elapsed with the tool at the closure, the timing circuit 54 operates to reverse the direction of motor 50 to move platform 42 and tool 20 back to the rest position to await the next signal from detector 56 or some other control system.

The tool control system shown in FIG. 3 is only illustrative of the various systems that can be employed. For example, instead of using a motor drive, an air of pneumatic cylinder can be used. A plurality of suitably controlled, angularly spaced tools also can be used so that a number of locks can be formed simultaneously or in a given sequence. As another alternative, the tool can be held stationary and the container and closure moved toward it. Such arrangements are well within the skill of the art.

Figure 2:
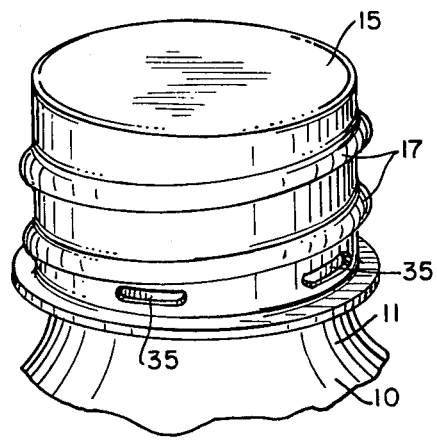
FIG. 2 is a perspective view of the container and closure showing a number of locking arrangements.
Figures 4, 4A:
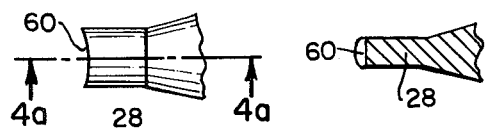
FIGS. 4 and 4A are plan and cross-sectional views of one form of tool tip for applying the energy.

FIGS. 4 and 4A show one shape for the tip 28 of the ultrasonic tool 20. Here the front face 60 of the tool is curved to conform substantially to the outer radius of the closure and the container. This shape tool makes a substantially uniform depression across the width in the closure and container, as shown in FIG. 2. If desired, a tool tip with a flat face can be used. However, they result in a depression of non-uniform depth.

Figures 5, 5A:
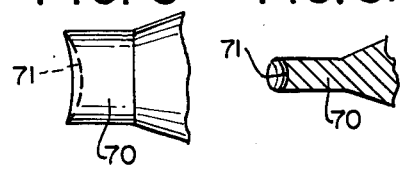
FIGS. 5 and 5A are plan and cross-sectional views of another form of tool tip.

It should be understood that other shape tool tip faces are within the scope of the invention, the shape being changed to produce a desired result. For example, FIGS. 5 and 5A show a tool tip 70 of the same general shape as in FIGS. 4 and 4A. Here, however, the face 71 is also made generally concave. This means that a large amount of energy is produced at the peripheral edge of the tip so that when the deformation is made in the closure and container, it will extend further in at the peripheral edge. This will further thin down the periphery of the wall of the portion of the closure that is deformed, meaning that it can be broken away more easily. This makes the closure more adaptable for use as a tamper-proof type.

Figure 6:
FIG. 6 is a perspective view of a closure and container showing a different orientation of the mechanical locks.

In FIG. 2, the depressions in the closure wall which form the projections 35 are shown as being oblong, generally corresponding to the tool tips of FIGS. 4 and 5, with the depressions being generally parallel with the closure top wall. In FIG. 6, the depressions 72 are shown in a more vertical position and angled against the direction of unscrewing of the closure. Using this arrangement, which can be readily produced by properly orienting the tip of tool 20, results in a lesser tendency for the projections 35 to shear off the closure wall. Any desired angular orientation of the mechanical locks can be used.

Figure 7A:
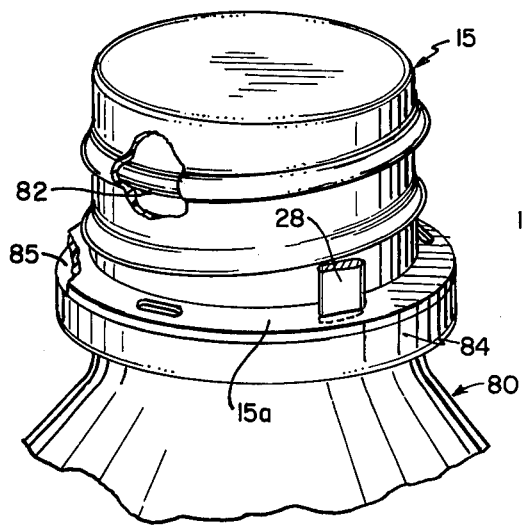
FIGS. 7A, 7B and 7C are perspective views showing the formation of the mechanical locks between the flange of the closure and the transfer ring of the container.
Figure 7B:
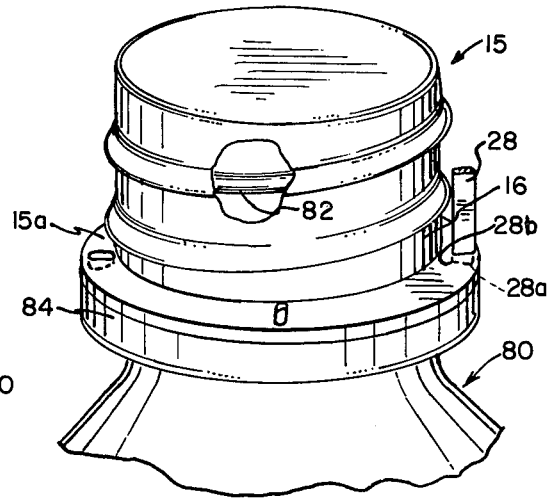

FIGS. 7A and 7B show another embodiment of the invention. Here a container 80 is shown which has the usual screw threads 82 on the upper portion of the container neck. A transfer ring 84 is formed around the neck of the container below the threads 82. Such transfer rings are well-known in the art of manufacturing containers and they are formed in a variety of shapes and sizes. In the embodiments of FIGS. 7A and 7B, the transfer ring 84 preferably has a flat upper surface 85.

The closure 15 in this case has a flange 15a which extends generally transversely from the bottom of the skirt wall. This is described in the foregoing application of Childs and Ostrowski. The height of the closure skirt wall and/or the location of the transfer ring 84 on the container are sized with respect to one another so that the flange 15a of the closure rests on the upper surface 85 of the transfer ring.

The workpiece, or tool, of the ultrasonic generator is moved relative to the container to engage the flange of the closure. Energy of a sufficient duration and quantity is applied to deform first the flange of the closure and then the transfer ring of the container to produce the lug and groove locking arrangement previously described. A number of such mechanical locks are formed around the closure.

The tool 28 of the ultrasonic transducer can approach and engage the closure flange 15a from any desired angle. For example, a tool with an elongated and flat front face on its tip can be used and the tool tip applied flat on the top of the flange, that is, from a direction parallel to the closure skirt wall. This is shown in FIG. 7A.

In FIG. 7B, the tool tip 28 is shown being placed generally transverse to the skirt wall 16. Here tool 28 has a first portion 28a, adjacent the outer edge of the closure flange 15a, which is longer than the portion 28b of the tool tip which is closest to the closure skirt wall 16. This tip shape can be produced either by making the front face of the tip with a curve surface, or a flat tapered surface, or in steps. In either case, the portion 28a of the tool tip adjacent the outer edge of the closure flange will move further into the transfer ring than the portion 28b closest to the closure skirt wall 16. Thus, the portion of the closure flange adjacent its edge which was deformed by the tip is the weakest since it has been deformed, or thinned down, the most. If this deformation is carried out to a sufficient degree, the weakened portions of the closure flange will be broken away from the closure when it is unscrewed from the container. This makes the closure tamper-proof.

It should be understood that the position of the tool tip 28 can be reversed by 180° from that shown in FIG. 7B. That is, the portion of the tool tip which makes the deepest penetration into the closure flange would be closest to the closure skirt wall 16.

Figure 7C:
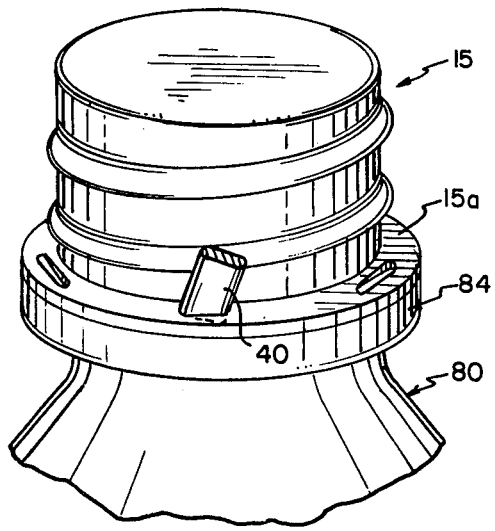

FIG. 7C shows an arrangement similar to FIG. 7A. Here, the tool tip is generally flat and it is moved into the closure flange 15a at an angle so that the deepest penetration of the tool tip into the flange and the transfer ring will be facing in the same direction as the direction of rotation of the closure when it is uncrewed. As seen, the force for unscrewing the closure is applied against the portion of the closure flange wall which is deformed and weakened the most. As this force is applied, the weakened deformed portion will shear off making the closure tamper proof. It should be understood that the same type of lock can be achieved by using a chisel ended, or generally triangular tool tip.

The tool tip of the general type shown in FIG. 7B can be utilized to form the locks in the skirt wall 16 of the closure, as shown for example in FIGS. 2 and 6. By doing this, a portion of the projection formed in the closure skirt wall will have a greater height than the other portion and be weakened more. The weakened portion of the projection, which also extends the furthest into the corresponding depression in the container, will shear off more readily as the closure is unscrewed from the container.

While screw type closures have been shown in the various embodiments of the invention, it should be understood that the arrangement of locks can be used with other types of closures. For example, it is applicable to a closure of the sleeve type (no threads) which merely is slipped over the neck of the container. Also, it can be used with a bayonet thread closure, half thread, etc.

What is claimed is:

1. A system for sealing a plastic closure having a generally cylindrical wall to the generally cylindrical neck of a container of plastic material comprising a work tool for applying ultrasonic energy to a portion of the wall of the plastic closure to distort the wall of the closure and the adjacent underlying neck portion of the container, means for supplying ultrasonic energy to said work tool for a time period sufficient to distort both said closure and said container, and means for moving said work tool relative to said closure and container in a limited path of travel while the work tool is receiving ultrasonic energy for an extent sufficient to produce a projection on the closure wall and a mating underlying depression on the container wall, said work tool including a tip to engage the outer wall of the closure and to apply the ultrasonic energy thereto, said tip being shaped to conform generally to the shape of the closure skirt wall to form a said projection on the closure wall of substantially uniform depth throughout.

2. A system for sealing a plastic closure having a generally cylindrical wall to the generally cylindrical neck of a container of plastic material comprising a work tool for applying ultrasonic energy to a portion of the wall of the plastic closure to distort the wall of the closure and the adjacent underlying neck portion of the container, means for supplying ultrasonic energy to said work tool for a time period sufficient to distort both said closure and said container, and means for moving said work tool relative to said closure and container in a limited path of travel while the work tool is receiving ultrasonic energy for an extent sufficient to produce a projection on the closure wall and a mating underlying depression on the container wall, said work tool including a tip to engage the outer wall of the closure and to apply ultrasonic energy thereto, said tip shaped to produce a projection on the closure wall having portions of different depth.

3. A system as in claim 2 wherein said tip is shaped to weaken the wall of the projection formed on said closure adajcent the area of said closure where said projection is deformed therefrom.

* * * * *